(12) United States Patent
Hu

(10) Patent No.: US 12,441,425 B2
(45) Date of Patent: Oct. 14, 2025

(54) BICYCLE CHAIN COVER

(71) Applicant: Cheng Uei Precision Industry Co., Ltd., New Taipei (TW)

(72) Inventor: Ching Lin Hu, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 498 days.

(21) Appl. No.: 18/104,378

(22) Filed: Feb. 1, 2023

(65) Prior Publication Data

US 2024/0059367 A1 Feb. 22, 2024

Related U.S. Application Data

(60) Provisional application No. 63/399,766, filed on Aug. 22, 2022.

(51) Int. Cl.
*B62J 13/04* (2006.01)

(52) U.S. Cl.
CPC ..................... *B62J 13/04* (2013.01)

(58) Field of Classification Search
CPC ............ B62J 13/04; B62J 13/00; B62J 13/06
See application file for complete search history.

(56) References Cited

U.S. PATENT DOCUMENTS

| | | | | | |
|---|---|---|---|---|---|
| 611,750 | A | * | 10/1898 | Fulford | B62J 13/00 |
| | | | | | 474/147 |
| 659,235 | A | * | 10/1900 | Jeffery | B62J 13/04 |
| | | | | | 474/147 |
| 3,939,730 | A | * | 2/1976 | DeHaan | B62J 13/04 |
| | | | | | 474/147 |
| 4,158,402 | A | * | 6/1979 | Romans | B62J 13/04 |
| | | | | | 474/147 |
| D507,995 | S | * | 8/2005 | Okada | B62J 13/04 |
| | | | | | D12/127 |
| 10,071,784 | B2 | * | 9/2018 | Callahan | B62K 3/06 |
| 11,492,060 | B2 | * | 11/2022 | Carlier | F16H 7/18 |
| 2009/0325751 | A1 | * | 12/2009 | Carstensen | B62J 13/04 |
| | | | | | 29/434 |
| 2017/0166279 | A1 | * | 6/2017 | Callahan | B62K 19/44 |
| 2020/0047837 | A1 | * | 2/2020 | Carlier | F16H 7/18 |
| 2023/0271666 | A1 | * | 8/2023 | Watanabe | B62K 13/08 |
| | | | | | 280/288.4 |

FOREIGN PATENT DOCUMENTS

| | | | | |
|---|---|---|---|---|
| CN | 209972694 U | * | 1/2020 | |
| EP | 343751 A | * | 5/1989 | B62J 13/04 |
| EP | 1795440 A2 | * | 6/2007 | B62J 13/00 |

* cited by examiner

*Primary Examiner* — Valentin Neacsu
*Assistant Examiner* — Michael R Stabley

(57) ABSTRACT

A bicycle chain cover includes a rear casing, an outer cover connected with the rear casing, and an inner cover connected with the rear casing. The inner cover and the outer cover are opposite to each other. The inner cover has two first ribs, two second ribs, a first ring and a second ring. The two first ribs are disposed at an inner edge of the inner cover. The two second ribs are disposed at the inner edge of the inner cover. The first ring is connected to the two first ribs. The second ring is connected to the two second ribs. The second ring is rotatably disposed in the first ring.

14 Claims, 4 Drawing Sheets

BICYCLE CHAIN COVER

CROSS-REFERENCE TO RELATED APPLICATION

This application claims the priorities of U.S. provisional patent application No. 63/399,766, filed on Aug. 22, 2022, which is incorporated herewith by reference.

BACKGROUND OF THE INVENTION

1. Field of the Invention

The present invention generally relates to a bicycle chain cover, and more particularly to an adjustable bicycle chain cover.

2. The Related Art

A chain cover is installed above a corresponding chain of a bicycle for a safety consideration. When a rider rides the bicycle, the chain cover is used for preventing the rider from touching a chain of the bicycle mistakenly, bottoms of trousers are prevented from getting involved in the chain of the bicycle to cause a danger, and the bottoms of the trousers are prevented from getting dirty. For a long time, the chain cover is always a troublesome issue for bicycle manufacturers on account of a durability and a cost of the chain cover. The chain cover is assembled difficultly, a bracket which is specifically adapted to a type of the chain cover is needed, and a frame for assembling the chain cover is also needed, so that the chain cover is prevented from contacting the chain of the bicycle.

After a current bicycle chain cover is integrally formed, the current bicycle chain cover has a fixed size. The bicycle chain cover must be manufactured individually according to different sizes, so that the current bicycle chain cover has poor applicability shortcomings. For example, sizes of chain plates of a road bicycle and a mountain bicycle are different. In order to fit with the two chain plates having the different sizes, the rider must buy the bicycle chain covers with the different sizes. Furthermore, the current bicycle chain cover is disposed between a front chain plate and a rear chain plate, and a position of the rear chain plate is slightly adjusted, so that the bicycle is comfortable in use. A distance between the front chain plate and the rear chain plate is slightly adjustable. However, the current bicycle chain cover has the fixed size. When the distance between the front chain plate and rear chain plate is changed, the bicycle chain cover is interfered with the chain plate or the chain to reduce a riding comfortableness and a safely of the bicycle.

Thus, it is essential to provide an adjustable bicycle chain cover which is adjusted according to different types of bicycles or different user needs to prevent the bicycle chain cover from interfering with a chain of the bicycle.

SUMMARY OF THE INVENTION

An object of the present invention is to provide a bicycle chain cover. The bicycle chain cover includes a rear casing, a first chain casing connected with the rear casing, and a second chain casing connected with the rear casing and the first chain casing. The first chain casing is connected with the rear casing. The first chain casing is slidable in the rear casing. The first chain casing has a first arc portion, a first extending portion, two first ribs and a first ring. The first extending portion is disposed at an outer rim of the first arc portion and extends towards the rear casing. A tail end of the first extending portion is connected with the rear casing. The tail end of the first extending portion is slidable in the rear casing. The two first ribs are disposed at an inner rim of the first arc portion. The first ring is connected to two inner ends of the two first ribs. The second chain casing is slidable in the rear casing. The first chain casing and the second chain casing are slidable with respect to each other. The second chain casing has a second arc portion, a second extending portion, two second ribs and a second ring. Two opposite ends of the second arc portion are slidably connected with two opposite ends of the first arc portion, respectively. The second extending portion is disposed at an outer rim of the second arc portion. The second extending portion and the first extending portion are disposed opposite to each other. A tail end of the second extending portion is connected with the rear casing. The tail end of the second extending portion is slidable in the rear casing. The two second ribs are disposed at an inner rim of the second arc portion. The second ring is connected to two inner ends of the two second ribs. The second ring is rotatably mounted in the first ring.

Another object of the present invention is to provide a bicycle chain cover. The bicycle chain cover includes a rear casing, a first outer cover, a first inner cover, a second outer cover and a second inner cover. The first outer cover is connected with one free end of the rear casing. The first inner cover is connected with the one free end of the rear casing. The first inner cover and the first outer cover are opposite to each other. The first outer cover and the first inner cover are buckled with each other. The first inner cover has two first ribs and a first ring. The two first ribs are disposed at an inner edge of the first inner cover. The first ring is connected to the two first ribs. The second outer cover is connected with the other free end of the rear casing. The first outer cover is connected with the second outer cover. The second inner cover is connected with the other free end of the rear casing. The second outer cover and the second inner cover are opposite to each other. The second outer cover and the second inner cover are buckled with each other. The second inner cover has two second ribs and a second ring. The two second ribs are disposed at an inner edge of the second inner cover. The second ring is connected to the two second ribs. The second ring is rotatably mounted in the first ring.

Another object of the present invention is to provide a bicycle chain cover. The bicycle chain cover includes a rear casing, an outer cover connected with the rear casing, and an inner cover connected with the rear casing. The inner cover and the outer cover are opposite to each other. The inner cover has two first ribs, two second ribs, a first ring and a second ring. The two first ribs are disposed at an inner edge of the inner cover. The two second ribs are disposed at the inner edge of the inner cover. The first ring is connected to the two first ribs. The second ring is connected to the two second ribs. The second ring is rotatably disposed in the first ring.

As described above, an angle between the first extending portion and the second extending portion is adjusted by rotating the first arc portion and the second arc portion. When the rear casing moves forward or rearward, the angle between the first extending portion and the second extending portion is able to be adjusted. When the rear casing moves forward, the angle between the first extending portion and the second extending portion need be enlarged, so that after the first chain casing and the second chain casing are connected to the rear casing, the first chain casing, the second chain casing and the rear casing are without being interfered with a chain of a bicycle. When the rear casing moves rearward, the angle between the first extending portion and the second extending portion need be reduced, so that after the first chain casing and the second chain casing are connected to the rear casing, the first chain casing, the second chain casing and the rear casing are without being interfered with the chain of the bicycle. As a result, the bicycle chain cover is capable of being adjusted according to different types of the bicycles or different user needs to prevent the bicycle chain cover from being interfered with the chain of the bicycle.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
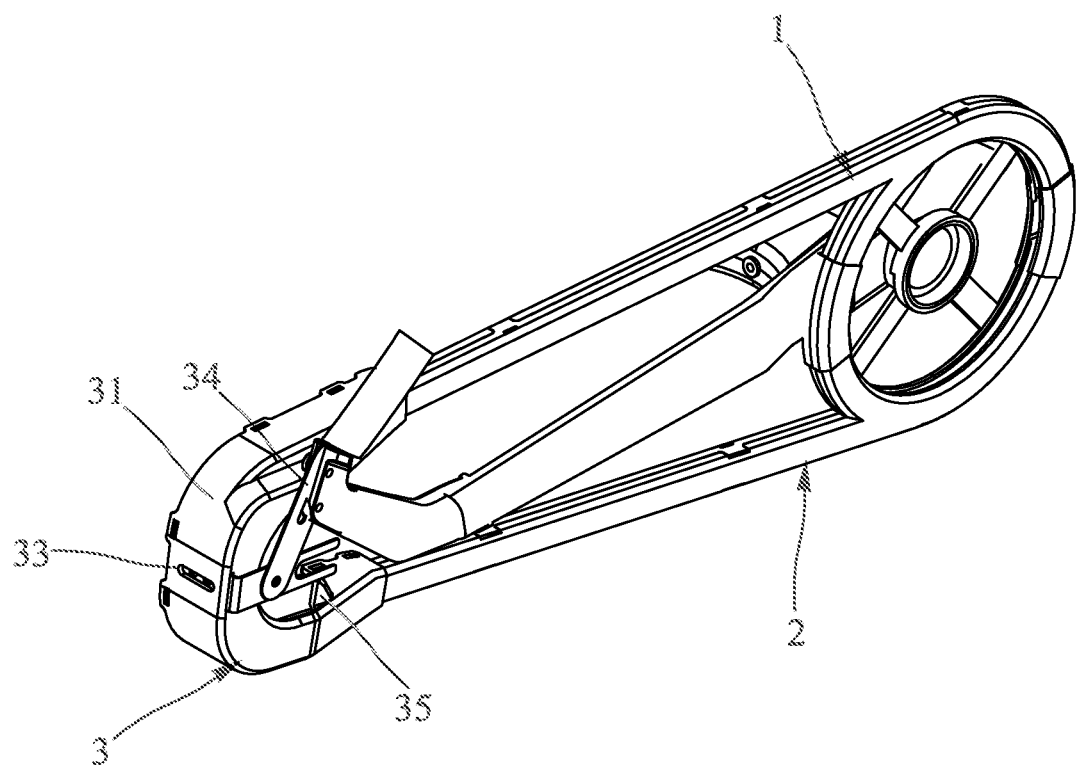
FIG. 1 is a perspective view of a bicycle chain cover in accordance with a preferred embodiment of the present invention.
Figure 2:
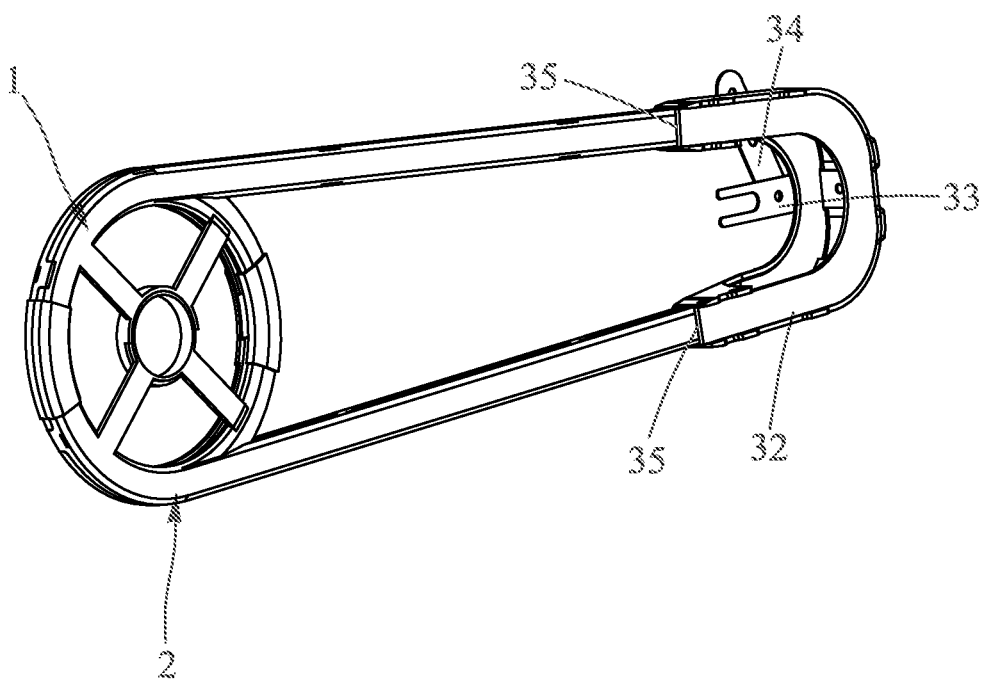
FIG. 2 is another perspective view of the bicycle chain cover of FIG. 1.

With reference to FIG. 1 and FIG. 2, a bicycle chain cover 100 in accordance with a preferred embodiment of the present invention is shown. The bicycle chain cover 100 includes a first chain casing 1, a second chain casing 2 and a rear casing 3. In the preferred embodiment, structures of the first chain casing 1 and the second chain casing 2 are approximately the same. The first chain casing 1 is rotatably connected to the second chain casing 2, and the first chain casing 1 and the second chain casing 2 are slidable with respect to the rear casing 3, so the bicycle chain cover 100 is adjustable.

The first chain casing 1 and the second chain casing 2 are disposed to a front chain plate of a bicycle (not shown). The first chain casing 1 and the second chain casing 2 are sheathed with each other. The first chain casing 1 and the second chain casing 2 are rotatably connected to each other. The first chain casing 1 and the second chain casing 2 are sleeved to a transmission shaft of the bicycle (not shown). The first chain casing 1 and the second chain casing 2 are used for covering a chain of the bicycle (not shown). The rear casing 3 is disposed to a rear chain plate of the bicycle (not shown). The first chain casing 1 is connected with one free end of the rear casing 3. The first chain casing 1 is slidable in the rear casing 3. The second chain casing 2 is connected with the first chain casing 1 and the other free end of the rear casing 3. The second chain casing 2 is slidable in the rear casing 3. The first chain casing 1 and the second chain casing 2 are slidable with respect to each other. The first chain casing 1, the second chain casing 2 and the rear casing 3 are able to move relatively, so that relative positions among the first chain casing 1, the second chain casing 2 and the rear casing 3 are adjusted. The rear casing 3 is disposed to a rear transmission shaft of the bicycle (not shown). In the preferred embodiment, the first chain casing 1 and the second chain casing 2 are made of plastic materials. The first chain casing 1 and the second chain casing 2 are without being limited to be the plastic materials in a concrete implementation.

In practice, the bicycle chain cover 100 is adjusted to different lengths according to different types of the bicycles. The rear casing 3 moves frontward or rearward to adjust positions of the rear casing 3. The first chain casing 1 and the second chain casing 2 are used for adjusting an angle between the first chain casing 1 and the second chain casing 2, after the first chain casing 1, the second chain casing 2 and the rear casing 3 are connected, the chain of the bicycle is without being interfered. When the rear casing 3 moves forward, the angle between the first chain casing 1 and the second chain casing 2 need be enlarged, in that case, after the first chain casing 1, the second chain casing 2 and the rear casing 3 are connected, the chain of the bicycle is without being interfered. When the rear casing 3 moves rearward, the angle between the first chain casing 1 and the second chain casing 2 need be reduced, in that case, after the first chain casing 1, the second chain casing 2 and the rear casing 3 are connected, the chain of the bicycle is without being interfered.

Figure 3:
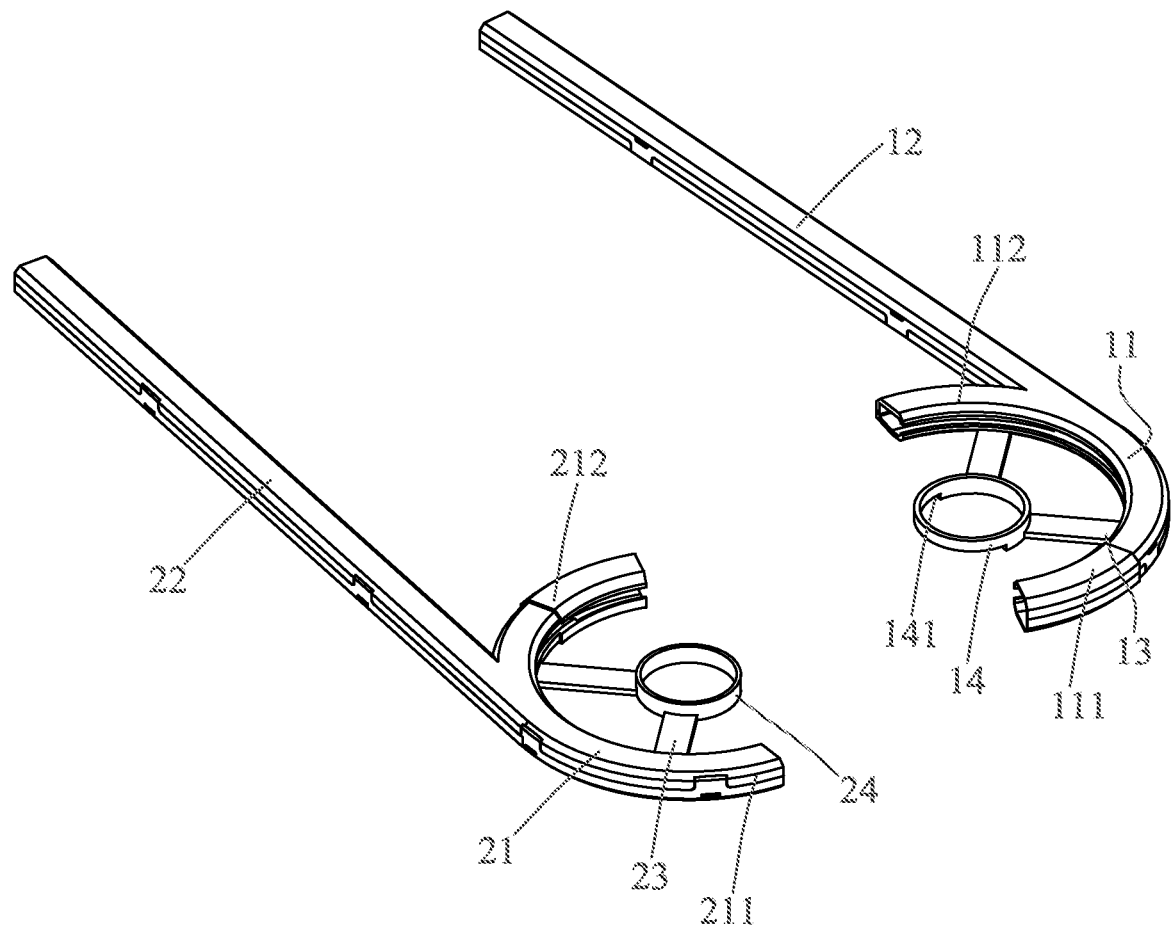
FIG. 3 is an exploded view showing that a first chain casing and a second chain casing of the bicycle chain cover of FIG. 1.
Figure 4:
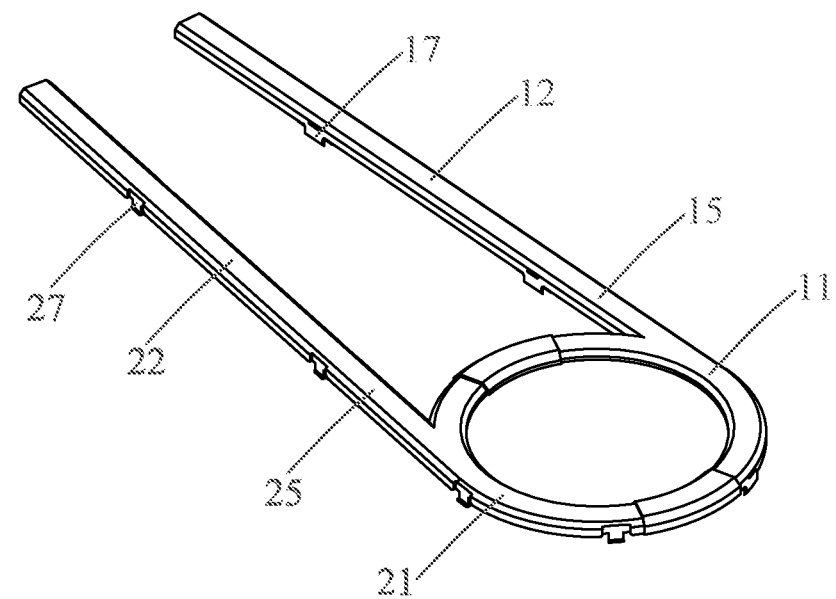
FIG. 4 is a partially exploded view of the bicycle chain cover of FIG. 1.
Figure 4:
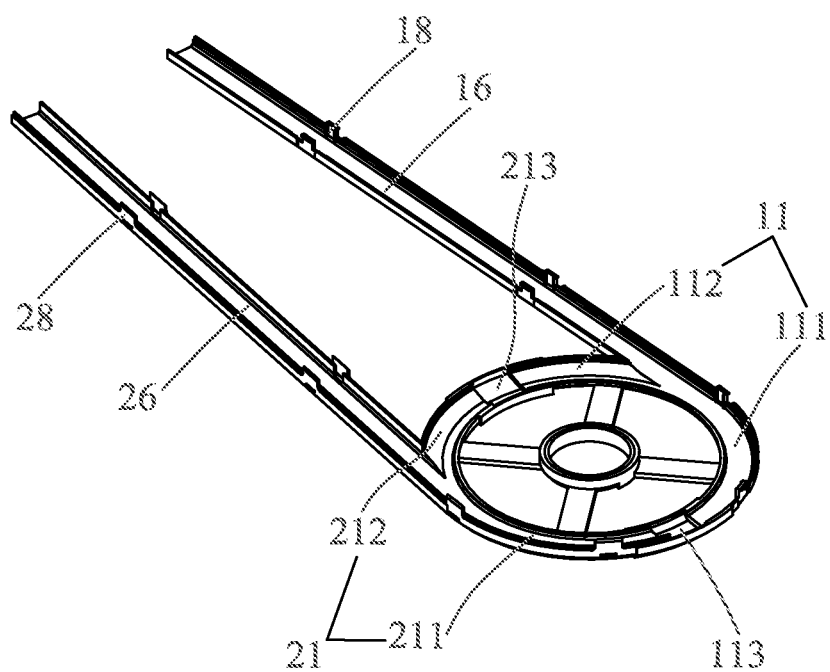

Referring to FIG. 3 and FIG. 4, the first chain casing 1 has a first arc portion 11, a first extending portion 12, two first ribs 13 and a first ring 14. In the preferred embodiment, the first arc portion 11 is a C shape structure. The first extending portion 12 is disposed at an outer rim of the first arc portion 11 and extends towards the rear casing 3. The two first ribs 13 are disposed at an inner rim of the first arc portion 11. The first arc portion 11 is used for connecting a corresponding mechanism of the second chain casing 2. The outer rim of the first arc portion 11 extends towards the rear casing 3 to form the first extending portion 12.

In the preferred embodiment, the first arc portion 11 has a first branch 111 and a second branch 112. The first branch 111 is bent frontward from a junction between the first arc portion 11 and the first extending portion 12. The second branch 112 is bent rearward from the junction between the first arc portion 11 and the first extending portion 12. Therefore, the first extending portion 12 is slantwise extended towards the second chain casing 2 and the rear casing 3 from a junction between the first branch 111 and the second branch 112. A tail end of the first extending portion 12 is connected with the rear casing 3. The tail end of the first extending portion 12 is slidable in the rear casing 3. The first extending portion 12 is disposed between the first arc portion 11 and the rear casing 3.

In the preferred embodiment, a free end of the first branch 111 is connected with the corresponding mechanism of the second chain casing 2. The free end of the first branch 111 is slidable with respect to the corresponding mechanism of the second chain casing 2. A free end of the second branch 112 is connected with the corresponding mechanism of the second chain casing 2. The free end of the second branch 112 is slidable with respect to the corresponding mechanism of the second chain casing 2. The first arc portion 11 surrounds the first ring 14, and the first arc portion 11 is spaced from the first ring 14. Two portions of the inner rim of the first arc portion 11 extend inward and towards the first ring 14 to form the two first ribs 13. The first ring 14 is disposed to two inner ends of the two first ribs 13, and the first ring 14 is connected to the two inner ends of the two first ribs 13. The first ring 14 is connected between the two inner ends of the two first ribs 13. A surface of the first ring 14 has a notch 141. The corresponding mechanism of second chain casing 2 abuts against an inner wall of the notch 141, so that the first chain casing 1 is located to the second chain casing 2, and the first chain casing 1 is fixed to the second chain casing 2.

The free end of the first branch 111 has a first location groove 113. The corresponding mechanism of the second chain casing 2 is received in the first location groove 113, so that the second chain casing 2 is located to the first chain casing 1, and the second chain casing 2 is fixed to the first chain casing 1. When the first chain casing 1 and the second chain casing 2 adjust the angle between the first chain casing 1 and the second chain casing 2, the first location groove 113 is used for avoiding that the first chain casing 1 and the second chain casing 2 are interfered with each other.

In the preferred embodiment, the first chain casing 1 has a first outer cover 15 and a first inner cover 16. The first outer cover 15 and the first inner cover 16 are opposite to each other. The first outer cover 15 and the first inner cover 16 are buckled with each other. The first inner cover 16 has the two first ribs 13 and the first ring 14. The two first ribs 13 and the first ring 14 are disposed at the first inner cover 16. The two first ribs 13 are disposed at an inner edge of the first inner cover 16. Two sides of an inner surface of one half of the first arc portion 11 and two sides of an inner surface of one half of the first extending portion 12 of the first outer cover 15 have a plurality of first restricting grooves 17. Two sides of an inner surface of the other half of the first arc portion 11 and two sides of an inner surface of the other half of the first extending portion 12 of the first inner cover 16 have a plurality of first locking hooks 18. Several portions of the two sides of the inner surface of the one half of the first arc portion 11 and the two sides of the inner surface of the one half of the first extending portion 12 of the first outer cover 15 are punched outward to form the plurality of the first restricting grooves 17. Several portions of the two sides of the inner surface of the other half of the first arc portion 11 and the two sides of the inner surface of the other half of the first extending portion 12 of the first inner cover 16 protrude towards the first outer cover 15 and then protrude outward to form the plurality of the first locking hooks 18. The plurality of the first locking hooks 18 are buckled with the plurality of the first restricting grooves 17 to buckle the first outer cover 15 with the first inner cover 16 to form the first chain casing 1.

In another specific preferred embodiment of the present invention, the plurality of the first locking hooks 18 are without being limited to be protruded from the first inner cover 16. Several portions of the two sides of the inner surface of the one half of the first arc portion 11 and the two sides of the inner surface of the one half of the first extending portion 12 of the first outer cover 15 have the plurality of the first locking hooks 18. Several portions of the two sides of the inner surface of the other half of the first arc portion 11 and the two sides of the inner surface of the other half of the first extending portion 12 of the first inner cover 16 have the plurality of the first restricting grooves 17.

The second chain casing 2 has a second arc portion 21, a second extending portion 22, two second ribs 23 and a second ring 24. The second arc portion 21 is the C shape structure. Mouths of the first arc portion 11 and the second arc portion 21 are opposite to each other. The second arc portion 21 is connected with the first arc portion 11 of the first chain casing 1. Two opposite ends of the second arc portion 21 are slidably connected with two opposite ends of the first arc portion 11, respectively. The second extending portion 22 is disposed at an outer rim of the second arc portion 21. The second extending portion 22 is extended from the outer rim of the second arc portion 21 and is extended towards the rear casing 3. The second extending portion 22 is disposed between the second arc portion 21 and the rear casing 3. The second extending portion 22 and the first extending portion 12 are disposed opposite to each other. The two second ribs 23 are disposed at an inner rim of the second arc portion 21. The second ring 24 is rotatably mounted in the first ring 14.

In the preferred embodiment, the second arc portion 21 has a third branch 211 and a fourth branch 212. The third branch 211 is bent frontward from a junction between the second arc portion 21 and the second extending portion 22. The fourth branch 212 is bent rearward from a junction between the second arc portion 21 and the second extending portion 22. In the preferred embodiment, a free end of the third branch 211 is slidably connected with the free end of the first branch 111. A free end of the fourth branch 212 is slidably connected with the free end of the second branch 112. Therefore, the second extending portion 22 is slantwise extended towards the first chain casing 1 and the rear casing 3 from a junction between the third branch 211 and the fourth branch 212. A tail end of the second extending portion 22 is connected with the rear casing 3. The tail end of the second extending portion 22 is slidable in the rear casing 3. The second extending portion 22 is disposed between the second arc portion 21 and the rear casing 3. The second arc portion 21 surrounds the second ring 24, and the second arc portion 21 is spaced from the second ring 24.

In the preferred embodiment, two portions of the inner rim of the second arc portion 21 extend inward and towards the second ring 24 to form the two second ribs 23. The second ring 24 is disposed between and is connected to the two second ribs 23. The second ring 24 is disposed to two inner ends of the two second ribs 23, and the second ring 24 is connected to the two inner ends of the two second ribs 23. The second ring 24 is connected between the two inner ends of the two second ribs 23. The second ring 24 is mounted in the first ring 14. The two second ribs 23 abut against the inner wall of the notch 141 of the first ring 14, so that the second ring 24 buckled in the first ring 14. A height of the notch 141 of the first ring 14 and a thickness of each second rib 23 of the second chain casing 2 are the same. The first ring 14 and the second ring 24 are mounted around a middle of an outside of the transmission shaft of the bicycle (not shown). The locations of the two first ribs 13 and the locations of the two second ribs 23 define the first ring 14 and the second ring 24 as a center. The locations of the two first ribs 13 and the locations of the two second ribs 23 are transversely disposed in a mirror image way.

The free end of the fourth branch 212 has a second location groove 213. The second branch 112 of the first arc portion 11 of the first chain casing 1 is slidably disposed in the second location groove 213 of the fourth branch 212. The third branch 211 is slidably disposed in the first location groove 113 of the first arc portion 11 of the first chain casing 1. When the first chain casing 1 and the second chain casing 2 adjust the angle between the first chain casing 1 and the second chain casing 2, the second location groove 213 is used for avoiding the first chain casing 1 from being interfered with the second chain casing 2. Therefore, an outer surface of the third branch 211 of the second chain casing 2 slides into the first branch 111 of the first chain casing 1, and the first branch 111 of the first chain casing 1 is mounted around the outer surface of the third branch 211 of the second chain casing 2. An outer surface of the second branch 112 of the first chain casing 1 slides into the fourth branch 212 of the second chain casing 2, and the fourth branch 212 of the second chain casing 2 is mounted around the outer surface of the second branch 112 of the first chain casing 1. The first ring 14 of the first chain casing 1 is rotatably mounted around the second ring 24 of the second chain casing 2, so that the first arc portion 11 and the second arc portion 21 are buckled to each other, and the first chain casing 1 and the second chain casing 2 adjust the angle between the first chain casing 1 and the second chain casing 2. In the preferred embodiment, the first arc portion 11 and the second arc portion 21 form a circular structure.

In the preferred embodiment, the second chain casing 2 includes a second outer cover 25 and a second inner cover 26. The second outer cover 25 and the second inner cover 26 are opposite to each other. The second outer cover 25 and the second inner cover 26 are buckled with each other. The second inner cover 26 has the two second ribs 23 and the second ring 24. The two second ribs 23 and the second ring 24 are disposed at the second inner cover 26. The two second ribs 23 are disposed at an inner edge of the second inner cover 26. Two sides of an inner surface of one half of the second arc portion 21 and two sides of an inner surface of one half of the second extending portion 22 of the second outer cover 25 have a plurality of second locking hooks 27. Two sides of an inner surface of the other half of the second arc portion 21 and two sides of an inner surface of the other half of the second extending portion 22 of the second inner cover 26 have a plurality of second restricting grooves 28. Several portions of the two sides of the inner surface of the one half of the second arc portion 21 and the two sides of the inner surface of the one half of the second extending portion 22 of the second outer cover 25 protrude towards the second outer cover 25 and then protrude outward to form the plurality of the second locking hooks 27. Several portions of the two sides of the inner surface of the other half of the second arc portion 21 and the two sides of the inner surface of the other half of the second extending portion 22 of the second inner cover 26 are punched outward to form the plurality of the second restricting grooves 28. The plurality of the second locking hooks 27 are buckled with the plurality of the second restricting grooves 28 to buckle the second outer cover 25 with the second inner cover 26 to form the second chain casing 2.

In another specific preferred embodiment of the present invention, the two sides of the inner surface of the one half of the second arc portion 21 and the two sides of the inner surface of the one half of the second extending portion 22 of the second outer cover 25 have the plurality of the second restricting grooves 28. The two sides of the inner surface of the other half of the second arc portion 21 and the two sides of the inner surface of the other half of the second extending portion 22 of the second inner cover 26 have the plurality of the second locking hooks 27.

In the preferred embodiment, the first outer cover 15 is connected with the one free end of the rear casing 3, and the first inner cover 16 is connected with the one free end of the rear casing 3. The second outer cover 25 is connected with the other free end of the rear casing 3, and the second inner cover 26 is connected with the other free end of the rear casing 3. The first outer cover 15 is connected with the second outer cover 25. The first inner cover 16 is connected with the second inner cover 26. In practice, the first outer cover 15 and the second outer cover 25 form an outer cover. The outer cover is connected with the rear casing 3. The first inner cover 16 and the second inner cover 26 form an inner cover. The inner cover is connected with the rear casing 3. The inner cover and the outer cover are opposite to each other. The inner cover has the two first ribs 13, the two second ribs 23, the first ring 14 and the second ring 24. The two first ribs 13 are disposed at an inner edge of the inner cover. The two second ribs 23 are disposed at the inner edge of the inner cover. The first ring 14 is connected to the two first ribs 13. The second ring 24 is connected to the two second ribs 23. The second ring 24 is rotatably disposed in the first ring 14.

In the preferred embodiment, an angle between the first extending portion 12 and the second extending portion 22 is adjusted by rotating the first arc portion 11 and the second arc portion 21 to avoid the bicycle chain cover 100 interfering with the chain of the bicycle (not shown). The first ring 14 and the second ring 24 are able to design as a first inner arc section and a second inner arc section. Structures of the first inner arc section and the second inner arc section are similar to structures of the first arc portion 11 and the second arc portion 21. The first inner arc section and the second inner arc section are connected with each other, so that the first inner arc section and the second inner arc section slide with respect to each other.

Referring to FIG. 1 and FIG. 2, the rear casing 3 has a third outer cover 31, a third inner cover 32, a first fastening element 33 and a second fastening element 34. The first fastening element 33 is an L shape. In the preferred embodiment, the third outer cover 31 and the third inner cover 32 are buckled with each other. Two opposite sides of the rear casing 3 form two accommodating spaces 35, respectively. The tail end of the first extending portion 12 and the tail end of the second extending portion 22 are fastened between the third outer cover 31 and the third inner cover 32. The tail end of the first extending portion 12 and the tail end of the second extending portion 22 are fastened in the two accommodating spaces 35 of the rear casing 3. The first fastening element 33 is disposed to a middle of the third outer cover 31 and is exposed out of a surface of the third outer cover 31. One end of the second fastening element 34 is disposed to a surface of the first fastening element 33. In practice, the first fastening element 33 is rotatably connected to a rear axle shaft of the bicycle (not shown). The second fastening element 34 is rotatably connected to a frame of the bicycle (not shown). The rear casing 3 is moved forward or rearward by a movement of the first fastening element 33 and the second fastening element 34.

When the rear casing 3 moves forward, the angle between the first extending portion 12 and the second extending portion 22 need be enlarged, so that after the first chain casing 1 and the second chain casing 2 are connected to the rear casing 3, the first chain casing 1, the second chain casing 2 and the rear casing 3 are without being interfered with the chain of the bicycle (not shown). When the rear casing 3 moves rearward, the angle between the first extending portion 12 and the second extending portion 22 need be reduced, so that after the first chain casing 1 and the second chain casing 2 are connected to the rear casing 3, the first chain casing 1, the second chain casing 2 and the rear casing 3 are without being interfered with the chain of the bicycle (not shown). In the preferred embodiment, the third outer cover 31 and the third inner cover 32 form a U shape structure.

As described above, the angle between the first extending portion 12 and the second extending portion 22 is adjusted by rotating the first arc portion 11 and the second arc portion 21. When the rear casing 3 moves forward or rearward, the angle between the first extending portion 12 and the second extending portion 22 is able to be adjusted. When the rear casing 3 moves forward, the angle between the first extending portion 12 and the second extending portion 22 need be enlarged, so that after the first chain casing 1 and the second chain casing 2 are connected to the rear casing 3, the first chain casing 1, the second chain casing 2 and the rear casing 3 are without being interfered with the chain of the bicycle. When the rear casing 3 moves rearward, the angle between the first extending portion 12 and the second extending portion 22 need be reduced, so that after the first chain casing 1 and the second chain casing 2 are connected to the rear casing 3, the first chain casing 1, the second chain casing 2 and the rear casing 3 are without being interfered with the chain of the bicycle. As a result, the bicycle chain cover 100 is capable of being adjusted according to different types of the bicycles or different user needs to prevent the bicycle chain cover 100 from being interfered with the chain of the bicycle.

What is claimed is:

1. A bicycle chain cover, comprising:
   a rear casing;
   a first chain casing connected with the rear casing, the first chain casing being slidable in the rear casing, the first chain casing having a first arc portion, a first extending portion, two first ribs and a first ring, the first extending portion being disposed at an outer rim of the first arc portion and extending towards the rear casing, a tail end of the first extending portion being connected with the rear casing, the tail end of the first extending portion being slidable in the rear casing, the two first ribs being disposed at an inner rim of the first arc portion, the first ring being connected to two inner ends of the two first ribs; and
   a second chain casing connected with the rear casing and the first chain casing, the second chain casing being slidable in the rear casing, the first chain casing and the second chain casing being slidable with respect to each other, the second chain casing having a second arc portion, a second extending portion, two second ribs and a second ring, two opposite ends of the second arc portion being slidably connected with two opposite ends of the first arc portion, respectively, the second extending portion being disposed at an outer rim of the second arc portion, the second extending portion and the first extending portion being disposed opposite to each other, a tail end of the second extending portion being connected with the rear casing, the tail end of the second extending portion being slidable in the rear casing, the two second ribs being disposed at an inner rim of the second arc portion, the second ring being connected to two inner ends of the two second ribs, the second ring being rotatably mounted in the first ring.

2. The bicycle chain cover as claimed in claim 1, wherein the first arc portion has a first branch and a second branch, the first branch is bent frontward from a junction between the first arc portion and the first extending portion, the second branch is bent rearward from the junction between the first arc portion and the first extending portion, the first extending portion is slantwise extended towards the second chain casing and the rear casing from a junction between the first branch and the second branch, the first extending portion is disposed between the first arc portion and the rear casing.

3. The bicycle chain cover as claimed in claim 2, wherein the second arc portion has a third branch and a fourth branch, the third branch is bent frontward from a junction between the second arc portion and the second extending portion, the fourth branch is bent rearward from the junction between the second arc portion and the second extending portion, the second extending portion is slantwise extended towards the first chain casing and the rear casing from a junction between the third branch and the fourth branch, a free end of the third branch is slidably connected with a free end of the first branch, a free end of the fourth branch is slidably connected with a free end of the second branch.

4. The bicycle chain cover as claimed in claim 3, wherein the free end of the first branch has a first location groove, the free end of the fourth branch has a second location groove, the second branch of the first arc portion of the first chain casing is slidably disposed in the second location groove, the third branch is slidably disposed in the first location groove.

5. The bicycle chain cover as claimed in claim 4, wherein the rear casing has a third outer cover, a third inner cover, a first fastening element and a second fastening element, the third outer cover and the third inner cover are buckled with each other, two opposite sides of the rear casing form two accommodating spaces, the tail end of the first extending portion and the tail end of the second extending portion are fastened in the two accommodating spaces of the rear casing, the first fastening element is disposed to a middle of the third outer cover and is exposed out of a surface of the third outer cover, one end of the second fastening element is disposed to a surface of the first fastening element.

6. The bicycle chain cover as claimed in claim 1, wherein the first chain casing has a first outer cover and a first inner cover, the first outer cover and the first inner cover are opposite to each other, the first outer cover and the first inner cover are buckled with each other, the two first ribs and the first ring are disposed at the first inner cover.

7. The bicycle chain cover as claimed in claim 6, wherein two sides of an inner surface of one half of the first arc portion and two sides of an inner surface of one half of the first extending portion of the first outer cover have a plurality of first restricting grooves, two sides of an inner surface of the other half of the first arc portion and two sides of an inner surface of the other half of the first extending portion of the first inner cover have a plurality of first locking hooks, the plurality of the first locking hooks are buckled with the plurality of the first restricting grooves.

8. The bicycle chain cover as claimed in claim 6, wherein two sides of an inner surface of one half of the first arc portion and two sides of an inner surface of one half of the first extending portion of the first outer cover have a plurality of first locking hooks, two sides of an inner surface of the other half of the first arc portion and two sides of an inner surface of the other half of the first extending portion of the first inner cover have a plurality of first restricting grooves, the plurality of the first locking hooks are buckled with the plurality of the first restricting grooves.

9. The bicycle chain cover as claimed in claim 8, wherein the second chain casing includes a second outer cover and a second inner cover, the second outer cover and the second inner cover are opposite to each other, the second outer cover and the second inner cover are buckled with each other, the two second ribs and the second ring are disposed at the second inner cover.

10. The bicycle chain cover as claimed in claim 9, wherein two sides of an inner surface of one half of the second arc portion and two sides of an inner surface of one half of the second extending portion of the second outer cover have a plurality of second locking hooks, two sides of an inner surface of the other half of the second arc portion and two sides of an inner surface of the other half of the second extending portion of the second inner cover have a plurality of second restricting grooves, the plurality of the second locking hooks are buckled with the plurality of the second restricting grooves.

11. The bicycle chain cover as claimed in claim 9, wherein two sides of an inner surface of one half of the second arc portion and two sides of an inner surface of one half of the second extending portion of the second outer cover have a plurality of second restricting grooves, two sides of an inner surface of the other half of the second arc portion and two sides of an inner surface of the other half of the second extending portion of the second inner cover have a plurality of second locking hooks, the plurality of the second locking hooks are buckled with the plurality of the second restricting grooves.

12. The bicycle chain cover as claimed in claim 1, wherein a surface of the first ring has a notch, the two second ribs abut against an inner wall of the notch of the first ring, a height of the notch of the first ring and a thickness of each second rib of the second chain casing are the same.

13. A bicycle chain cover, comprising:
   a rear casing;
   a first outer cover connected with one free end of the rear casing;
   a first inner cover connected with the one free end of the rear casing, the first inner cover and the first outer cover being opposite to each other, the first outer cover and the first inner cover being buckled with each other, the first inner cover having two first ribs and a first ring, the two first ribs being disposed at an inner edge of the first inner cover, the first ring being connected to the two first ribs;
   a second outer cover connected with the other free end of the rear casing, the first outer cover being connected with the second outer cover; and
   a second inner cover connected with the other free end of the rear casing, the second outer cover and the second inner cover being opposite to each other, the second outer cover and the second inner cover being buckled with each other, the second inner cover having two second ribs and a second ring, the two second ribs being disposed at an inner edge of the second inner cover, the second ring being connected to the two second ribs, the second ring being rotatably mounted in the first ring.

14. A bicycle chain cover, comprising:
   a rear casing;
   an outer cover connected with the rear casing; and
   an inner cover connected with the rear casing, the inner cover and the outer cover being opposite to each other, the inner cover having two first ribs, two second ribs, a first ring and a second ring, the two first ribs being disposed at an inner edge of the inner cover, the two second ribs being disposed at the inner edge of the inner cover, the first ring being connected to the two first ribs, the second ring being connected to the two second ribs, the second ring being rotatably disposed in the first ring.

* * * * *